United States Patent
Bernard

(10) Patent No.: US 7,376,645 B2
(45) Date of Patent: May 20, 2008

(54) MULTIMODAL NATURAL LANGUAGE QUERY SYSTEM AND ARCHITECTURE FOR PROCESSING VOICE AND PROXIMITY-BASED QUERIES

(75) Inventor: David E. Bernard, Duluth, GA (US)

(73) Assignee: The Intellection Group, Inc., Duluth, GA (US)

( * ) Notice: Subject to any disclaimer, the term of this patent is extended or adjusted under 35 U.S.C. 154(b) by 497 days.

(21) Appl. No.: 11/041,605

(22) Filed: Jan. 24, 2005

(65) Prior Publication Data

US 2006/0116987 A1 Jun. 1, 2006

Related U.S. Application Data

(60) Provisional application No. 60/631,339, filed on Nov. 29, 2004.

(51) Int. Cl.
*G06F 17/30* (2006.01)

(52) U.S. Cl. .................. 707/3; 707/10; 704/9; 704/246; 709/203; 709/219

(58) Field of Classification Search .................... 707/3, 707/10; 704/9, 246; 709/203, 219
See application file for complete search history.

(56) References Cited

U.S. PATENT DOCUMENTS

| | | | |
|---|---|---|---|
| 5,727,057 A * | 3/1998 | Emery et al. .......... | 379/201.07 |
| 5,802,526 A | 9/1998 | Fawcett et al. | |
| 5,819,220 A | 10/1998 | Sarukkai et al. | |
| 6,446,064 B1 | 9/2002 | Livowsky | |
| 6,615,172 B1 | 9/2003 | Bennett et al. | |
| 6,934,684 B2 * | 8/2005 | Alpdemir et al. ........... | 704/265 |
| 2001/0039493 A1 | 11/2001 | Pustejovsky et al. | |
| 2002/0169611 A1 * | 11/2002 | Guerra et al. .............. | 704/270 |
| 2003/0023440 A1 * | 1/2003 | Chu .......................... | 704/249 |
| 2003/0115192 A1 | 6/2003 | Kil et al. | |
| 2004/0044516 A1 | 3/2004 | Kennewick et al. | |
| 2004/0117189 A1 | 6/2004 | Bennett | |

* cited by examiner

*Primary Examiner*—Leslie Wong
(74) *Attorney, Agent, or Firm*—Clements Bernard Miller; Christopher L. Bernard; Lawrence A. Baratta, Jr.

(57) ABSTRACT

The present invention provides a wireless natural language query system, architecture, and method for processing multimodally-originated queries, including voice and proximity-based queries. The natural language query system includes a Web-enabled device including a speech input module for receiving a voice-based query in natural language form from a user and a location/proximity module for receiving location/proximity information from a location/proximity device. The natural language query system also includes a speech conversion module for converting the voice-based query in natural language form to text in natural language form and a natural language processing module for converting the text in natural language form to text in searchable form. The natural language query system further includes a semantic engine module for converting the text in searchable form to a formal database query and a database-look-up module for using the formal database query to obtain a result related to the voice-based query in natural language form from a database.

30 Claims, 3 Drawing Sheets

MULTIMODAL NATURAL LANGUAGE QUERY SYSTEM AND ARCHITECTURE FOR PROCESSING VOICE AND PROXIMITY-BASED QUERIES

CROSS-REFERENCE TO RELATED APPLICATION(S)

The present non-provisional patent application claims the benefit of U.S. Provisional Patent Application No. 60/631,339, entitled "MULTIMODAL NATURAL LANGUAGE QUERY SYSTEM AND ARCHITECTURE FOR PROCESSING VOICE AND PROXIMITY-BASED QUERIES," filed Nov. 29, 2004, which is herein incorporated in full by reference.

FIELD OF THE INVENTION

The present invention relates generally to a wireless multimodal natural language query system and architecture for processing voice and proximity-based queries. More specifically, the present invention relates to a wireless multimodal natural language query system and architecture for processing voice and proximity-based queries including a location or proximity system or device, such as a global positioning system (GPS), radio frequency identification (RFID) device, or the like. This location or proximity system or device provides the multimodal natural language query system and architecture with a plurality of advanced capabilities.

BACKGROUND OF THE INVENTION

The use of personal computers (PCs), personal digital assistants (PDAs), Web-enabled phones, wireline and wireless networks, the Internet, Web-based query systems and engines, and the like has gained relatively widespread acceptance in recent years. This is due, in large part, to the relatively widespread availability of high-speed, broadband Internet access through digital subscriber lines (DSLs) (including asymmetric digital subscriber lines (ADSLs) and very-high-bit-rate digital subscriber lines (VDSLs)), cable modems, satellite modems, and the like. Thus far, user interaction with PCs, PDAs, Web-enabled phones, wireline and wireless networks, the Internet, Web-based query systems and engines, and the like has been primarily non-voice-based, through keyboards, mice, intelligent electronic pads, monitors, printers, and the like. This has limited the adoption and use of these devices and systems somewhat, and it has long been felt that allowing for accurate, precise, and reliable voice-based user interaction, mimicking normal human interaction, would be advantageous. For example, allowing for accurate, precise, and reliable voice-based user interaction would certainly draw more users to e-commerce, e-support, e-learning, etc., and reduce learning curves.

In this context, "mimicking normal human interaction" means that a user would be able to speak a question into a Web-enabled device or the like and the Web-enabled device or the like would respond quickly with an appropriate answer or response, through text, graphics, or synthesized speech, the Web-enabled device or the like not simply converting the user's question into text and performing a routine search, but truly understanding and interpreting the user's question. Thus, if the user speaks a non-specific or incomplete question into the Web-enabled device or the like, the Web-enabled device or the like would be capable of inferring the user's meaning based on context or environment. This is only possible through multimodal input.

Several software products currently allow for limited voice-based user interaction with PCs, PDAs, and the like. Such software products include, for example, ViaVoice™ by International Business Machines Corp. and Dragon NaturallySpeaking™ by Scansoft, Inc. These software products, however, allow a user to perform dictation, voice-based command-and-control functions (opening files, closing files, etc.), and voice-based searching (using previously-trained uniform resource locators (URLs)), only after time-consuming, and often inaccurate, imprecise, and unreliable, voice training. Their accuracy rates are inextricably tied to a single user that has provided the voice training.

Typical efforts to implement voice-based user interaction in a support and information retrieval context may be seen in U.S. Pat. No. 5,802,526, to Fawcett et al. (Sep. 1, 1998). Typical efforts to implement voice-based user interaction in an Internet context may be seen in U.S. Pat. No. 5,819,220, to Sarukkai et al. (Oct. 6, 1998).

U.S. Pat. No. 6,446,064, to Livowsky (Sep. 3, 2002), discloses a system and method for enhancing e-commerce using a natural language interface. The natural language interface allows a user to formulate a query in natural language form, rather than using conventional search terms. In other words, the natural language interface provides a "user-friendly" interface. The natural language interface may process a query even if there is not an exact match between the user-formulated search terms and the content in a database. Furthermore, the natural language interface is capable of processing misspelled queries or queries having syntax errors. The method for enhancing e-commerce using a natural language interface includes the steps of accessing a user interface provided by a service provider, entering a query using a natural language interface, the query being formed in natural language form, processing the query using the natural language interface, searching a database using the processed query, retrieving results from the database, and providing the results to the user. The system for enhancing e-commerce on the Internet includes a user interface for receiving a query in natural language form, a natural language interface coupled to the user interface for processing the query, a service provider coupled to the user interface for receiving the processed query, and one or more databases coupled to the user interface for storing information, wherein the system searches the one or more databases using the processed query and provides the results to the user through the user interface.

U.S. Pat. No. 6,615,172, to Bennett et al. (Sep. 2, 2003), discloses an intelligent query system for processing voice-based queries. This distributed client-server system, typically implemented on an intranet or over the Internet accepts a user's queries at the user's PC, PDA, or workstation using a speech input interface. After converting the user's query from speech to text, a two-step algorithm employing a natural language engine, a database processor, and a full-text standardized query language (SQL) database is implemented to find a single answer that best matches the user's query. The system, as implemented, accepts environmental variables selected by the user and is scalable to provide answers to a variety and quantity of user-initiated queries.

U.S. Patent Application Publication No. 2001/0039493, to Pustejovsky et al. (Nov. 8, 2001), discloses, in an exemplary embodiment, a system and method for answering voice-based queries using a remote mobile device, e.g., a mobile phone, and a natural language system.

U.S. Patent Application Publication No. 2003/0115192, to Kil et al. (Jun. 19, 2003), discloses, in various embodiments, an apparatus and method for controlling a data mining operation by specifying the goal of data mining in natural language, processing the data mining operation without any further input beyond the goal specification, and displaying key performance results of the data mining operation in natural language. One specific embodiment includes providing a user interface having a control for receiving natural language input describing the goal of the data mining operation from the control of the user interface. A second specific embodiment identifies key performance results, providing a user interface having a control for communicating information, and communicating a natural language description of the key performance results using the control of the user interface. In a third specific embodiment, input data determining a data mining operation goal is the only input required by the data mining application.

U.S. Patent Application Publication No. 2004/0044516, to Kennewick et al. (Mar. 4, 2004), discloses systems and methods for receiving natural language queries and/or commands and executing the queries and/or commands. The systems and methods overcome some of the deficiencies of other speech query and response systems through the application of a complete speech-based information query, retrieval, presentation, and command environment. This environment makes significant use of context, prior information, domain knowledge, and user-specific profile data to achieve a natural language environment for one or more users making queries or commands in multiple domains. Through this integrated approach, a complete speech-based natural language query and response environment may be created. The systems and methods create, store, and use extensive personal profile information for each user, thereby improving the reliability of determining the context and presenting the expected results for a particular question or command.

U.S. Patent Application Publication No. 2004/0117189, to Bennett (Jun. 17, 2004), discloses an intelligent query system for processing voice-based queries. This distributed client-server system, typically implemented on an intranet or over the Internet, accepts a user's queries at the user's PC, PDA, or workstation using a speech input interface. After converting the user's query from speech to text, a natural language engine, a database processor, and a full-text SQL database are implemented to find a single answer that best matches the user's query. Both statistical and semantic decoding are used to assist and improve the performance of the query recognition.

Each of the systems, apparatuses, software products, and methods described above suffers from at least one of the following shortcomings. Several of the systems, apparatuses, software products, and methods require time-consuming, and often inaccurate, imprecise, and unreliable, voice training. Several of the systems, apparatuses, software products, and methods are single-modal, meaning that a user may interact with each of the systems, apparatuses, software products, and methods in only one way, i.e. each utilizes only a single voice-based input. As a result of this single-modality, there is no context or environment within which a voice-based search is performed and several of the systems, apparatuses, software products, and methods must perform multiple iterations to pinpoint a result or answer related to the voice-based search.

Thus, what is needed are natural language query systems, architectures, and methods for processing voice and proximity-based queries that do not require time-consuming, and often inaccurate, imprecise, and unreliable, voice training. What is also needed are natural language query systems, architectures, and methods that are multimodal, meaning that a user may interact with the natural language query systems, architectures, and methods in a number of ways simultaneously and that the natural language query systems, architectures, and methods utilize multiple inputs in order to create and take into consideration a context or environment within which a voice and/or proximity-based search or the like is performed. In other words, what is needed are natural language query systems, architectures, and methods that mimic normal human interaction, attributing meaning to words based on the context or environment within which they are spoken. What is further needed are natural language query systems, architectures, and methods that perform only a single iteration to pinpoint a result or answer related to a voice and/or proximity-based search or the like.

BRIEF SUMMARY OF THE INVENTION

In various embodiments, the present invention provides a natural language query system, architecture, and method for processing voice and proximity-based queries that do not require time-consuming, and often inaccurate, imprecise, and unreliable, voice training. The present invention also provides a natural language query system, architecture, and method that are multimodal, meaning that a user may interact with the natural language query system, architecture, and method in a number of ways simultaneously and that the natural language query system, architecture, and method utilize multiple inputs in order to create and take into consideration a context or environment within which a voice and/or proximity-based search or the like is performed. In other words, the present invention provides a natural language query system, architecture, and method that mimic normal human interaction, attributing meaning to words based on the context or environment within which they are spoken. This context or environment may be prior information-based, domain knowledge-based, user-specific profile data-based, and/or, preferably, location or proximity-based. The present invention further provides a natural language query system, architecture, and method that perform only a single iteration to pinpoint a result or answer related to a voice and/or proximity-based search or the like.

Functionally, the present invention provides a natural language query system, architecture, and method that do more than simply convert speech to text, use this text to search a database, and convert text to speech. The natural language query system, architecture, and method of the present invention are capable of understanding speech and providing appropriate and useful responses. Off-the-shelf tools are used to incorporate and combine speech recognition, natural language processing (NLP), also referred to as natural language understanding, and speech synthesis technologies. NLP understands grammar (how words connect and how their definitions relate to one another), context, and environment.

In one specific embodiment of the present invention, a natural language query system for processing voice and proximity-based queries includes a Web-enabled device including a speech input module for receiving a voice-based query in natural language form from a user and a location/proximity module for receiving location/proximity information from a location/proximity device. The natural language query system also includes a speech conversion module for converting the voice-based query in natural language form to text in natural language form and a natural language processing module for converting the text in natural language form to text in searchable form. The natural language query system further includes a semantic engine module for converting the text in searchable form to a formal database query and a database-look-up module for using the formal database query to obtain a result related to the voice-based query in natural language form from a database.

In another specific embodiment of the present invention, a natural language query architecture for processing voice and proximity-based queries includes a Web-enabled device including a speech plug-in for receiving a voice-based query in natural language form from a user and a location/proximity plug-in for receiving location/proximity information from a location/proximity device. The natural language query architecture also includes a speech conversion algorithm for converting the voice-based query in natural language form to text in natural language form and a natural language processing algorithm for converting the text in natural language form to text in searchable form. The natural language query architecture further includes a semantic engine algorithm for converting the text in searchable form to a formal database query and a database-look-up algorithm for using the formal database query to obtain a result related to the voice-based query in natural language form from a database.

In a further specific embodiment of the present invention, a natural language query method for processing voice and proximity-based queries includes providing a device including a speech input module for receiving a voice-based query in natural language form from a user and a location/proximity module for receiving location/proximity information from a location/proximity device. The natural language query method also includes converting the voice-based query in natural language form to text in natural language form using a speech conversion module and converting the text in natural language form to text in searchable form using a natural language processing module. The natural language query method further includes converting the text in searchable form to a formal database query using a semantic engine module and obtaining a result related to the voice-based query in natural language form from a database using the formal database query and a database-look-up module.

BRIEF DESCRIPTION OF THE DRAWINGS

The present invention is illustrated and described herein with reference to various figures, in which like reference numbers denote like components, parts, or steps, and in which.

DETAILED DESCRIPTION OF THE INVENTION

Figure 1:
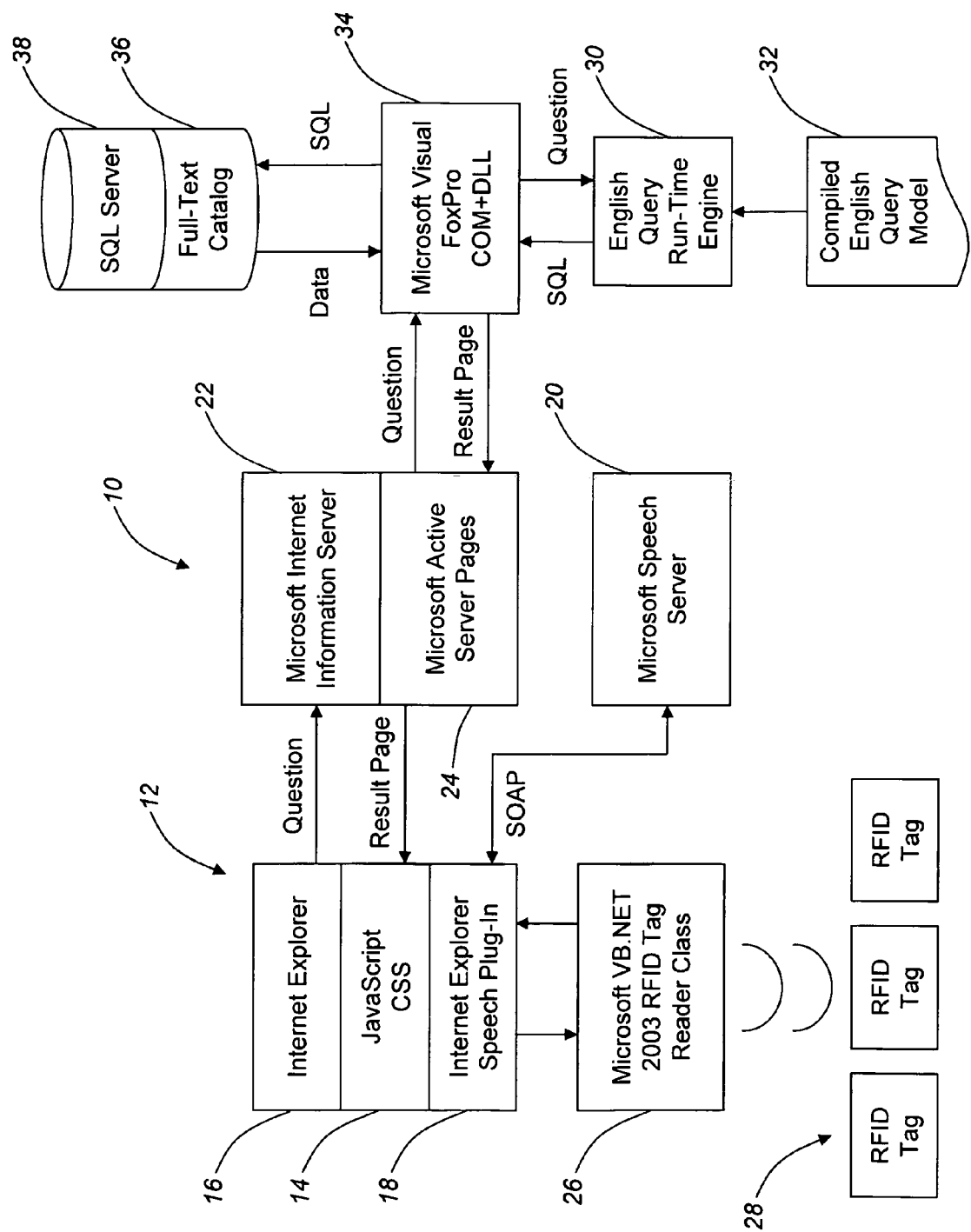
FIG. 1 is a schematic diagram illustrating one embodiment of the multimodal natural language query system and architecture for processing voice and proximity-based queries of the present invention.

In general, the natural language query system and architecture of the present invention incorporate and combine the following technologies:

1. Speech Processing—Speech processing allows PCs, PDAs, Web-enabled phones, and the like to recognize—and, to some extent, understand—spoken language. Spoken language is "eyes free" and "hands free", allowing a PC, PDA, Web-enabled phone, or the like to be used anywhere. This technology has engendered two types of software products: continuous-speech recognition software products and command-and-control software products. Because a context-free grammar allows a speech recognition engine to reduce recognized words to those contained in a predetermined list, high degrees of speech recognition may be achieved in a speaker-independent environment. A context-free grammar may be used with relatively inexpensive microphones, limited central processing units (CPUs), and no time-consuming, and often inaccurate, imprecise, and unreliable, voice training. Although speech processing technology is not new, speech recognition accuracy rates are just now becoming acceptable for natural language discourse.

2. Speech Synthesis—The ability to mimic speech is useful for applications that require spontaneous user interaction, or in situations where viewing or reading are impractical, such as, for example, when a PC, PDA, Web-enabled phone, or the like provide driving directions or instructions to the driver of a vehicle. In software products aimed at the average user, it is important that output sounds are pleasant and sound human enough to encourage regular use. Several software products now bring relatively inexpensive and effective conversational access to information applications and accelerate the acceptance of speech as a user interface alternative for Web-based and mobile applications, including, for example, Microsoft Speech Server by Microsoft Corp. Microsoft Speech Server currently supports eight languages and is based on the open-standard Speech Application Language Tags (SALT) specification, which extends familiar mark-up languages and leverages the existing Web-development paradigm.

3. Natural Language Processing—NLP systems interpret written, rather than spoken, language and may be found in speech processing systems that begin by converting spoken input into text. Using lexicons and grammar rules, NLP parses sentences, determines underlying meanings, and retrieves or constructs responses. NLP technology's main use is in enabling databases to answer queries presented in the form of questions. Another use is in handling high-volume email. NLP performance may be improved by incorporating a common sense knowledge base—that is, a set of real-world rules. Almost all of the database query languages tend to be rigid and difficult to learn, and it is often difficult for even the most experienced user to get desired information out of a database. A natural language interface to the SQL language overcomes the need for users to master the complexities of the SQL language.

4. English Query—English query (EQ) is a component of Microsoft SQL Server 2000 by Microsoft Corp. that allows users to query databases using plain English. The EQ engine creates a database query that may be executed under program control to return a formatted answer. The development process is at a higher level than traditional programming, but may be mastered by non-programmers with some database background. In order to implement natural language searching, an authoring tool is used to provide domain knowledge to the EQ engine, and to relate database entities to objects in the domain. EQ uses verb relationships and the like to perform natural language parsing of users' questions, which provides better search results than keyword-based technologies. The goal of EQ is to identify and model all of the relationships between entities in a database, creating a semantic model that defines a knowledge domain. This enables EQ to provide answers to a relatively wide range of questions without having to identify those questions in advance.

5. Input Devices—Adding speech recognition capability to an EQ application with a microphone or the like allows a user to type or speak a question to the EQ application. Such a speech interface may also be incorporated into a PDA or smart phone with wireless Internet capability. The combination of speech recognition and EQ represents a powerful method for a user to quickly access information in a SQL Server database.

6. Multimodality—Multimodality combines graphics, text, audio, and avatar output with text, ink, speech, body attitude, gaze, RFID, GPS, and touch input to provide a greatly enhanced user experience. It is enabled by the convergence of voice, data, and content, and by multimedia, Internet protocol (IP), speech, and wireless technologies hosted on a wide range of devices and device combinations. As compared to single-modal visual and voice applications, multimodal applications are more intuitive and easier to use. A user may select how to best interact with an application, which is especially useful with newer, smaller-form-factor devices. When modalities are used contemporaneously, the resulting decrease in mutual disambiguation (MD) input error rates improves accuracy, performance, and robustness.

7. Radio Frequency Identification—RFID is a generic term for technologies that automatically identify one or more objects via radio waves, using a unique serial number stored in a RFID tag. The RFID tag's antenna, tuned to receive a RFID reader's electromagnetic waves in real time, is able to transmit identification information to the RFID reader. The RFID reader converts the radio waves received from the RFID tag into digital information which, in turn, may be passed on to a business system for processing and/or storage. RFID reader technology may be integrated with PDAs via a PC Card implementation. RFID tags tend to be small and lightweight and may be read through nonmetallic materials. The RFID reader does not have to touch a RFID tag, making RFID ideal for adverse and/or unclean environments. Likewise, RFID does not require line of sight between a tag and a reader, allowing the tags to be hidden under the skin, inside clothes, within the pages of a book, etc., preserving the items usability and aesthetics. RFID tags come in two varieties: passive (low power, short range, and relatively inexpensive) and active (high power, long range, and relatively expensive). Preferably, the natural language query system, architecture, and method of the present invention utilize active RFID tags that run on their own power and transmit over long distances. The battery life of a typical active RFID tag is about five years.

The natural language query system and architecture of the present invention incorporate and combine the following exemplary components:

Web/Speech/Data Server Running Microsoft Windows 2003
Web Server: Microsoft Internet Information Services (IIS) 6.0
Database: Microsoft SQL Server 2000 SP4
Microsoft SQL Server 2000 English Query with Visual Studio NET 2003 tools
Microsoft SQL server 2000 Full-Text Indexing
Microsoft Speech Server 1.0
Microsoft Speech Application SDK Version 1.0
Simple Object Access Protocol (SOAP) 3.0
HP iPAQ h5550 Pocket PC Running Microsoft Pocket PC 2003 Premium
HP iPAQ FA120A PC Card Expansion Pack Plus
Identec Solutions iCard III RFID Reader
Identec Solutions iD2, iQ32, and iQ8 RFID Tags
Speech Add-In For Microsoft Pocket Internet Explorer
D-Link DI-614+Wireless Broadband Router
Speech Application Language tags (SALT) Protocol
DHTML, JavaScript, VBScript (ASP), CSS
Microsoft Visual FoxPro 8.0 SP1
Microsoft Component Services
Visual BASIC .NET using Visual Studio .NET 2003

It should be noted that components performing similar functions and/or achieving similar results may also be used.

Referring to FIG. 1, in one specific embodiment of the present invention, the natural language query system 10 includes a Web-enabled device 12, such as a portable PC (a laptop PC or the like), a PDA, a Web-enabled phone, or the like capable of accessing one or more interactive Hyper Text Mark-Up Language (HTML) or Dynamic Hyper Text Mark-Up Language (DHTML) Web pages 14 (each utilizing JavaScript, Visual basic Scripting Edition (VBScript), Active Server Pages (ASPs), Cascading Style Sheets (CSSs), etc.) via the Internet using a resident browser application 16, such as Internet Explorer or the like. Preferably, the Web-enabled device 12 is mobile and may be relatively easily carried by a user. The Web-enabled device 12 includes a speech plug-in 18, such as Speech Plug-In for Microsoft Pocket Internet Explorer or the like, and is in communication with a speech server 20, such as Microsoft Speech Server 1.0 or the like. Together, the speech plug-in 18 and the speech server 20 provide the Web-enabled device 12 with the ability to receive a voice-based query from a user and convert the speech to text. Specifically, once a speak button or the like associated with the Web-enabled device 12 has been pushed, the speech plug-in 18 detects that a voice-based query has begun, records the voice-based query, and continues until silence is detected. Optionally, the display of the Web-enabled device 12 may display an audio meter that provides the user with real time feedback regarding volume, background noise, and word gaps that provide the user with an improved interactive experience with the Web-enabled device 12. The speech plug-in 18 then sends the recorded voice-based query to the speech server 20, which converts the voice-based query to text and returns the text to the Web-enabled device 12. Preferably, the user's interaction with the Web-enabled device 12 takes place through a speech-enabled Web-page resident on a remote server 22 running one or more ASPs 24. This Web page is displayed on the display of the Web-enabled device 12.

The Web-enabled device 12 also includes a location or proximity system or device, such as a GPS or RFID device. In the event that a RFID device is utilized, the Web-enabled device 12 includes an RFID reader 26, such as an Identec Solutions iCard III RFID Reader or the like. The RFID reader 26 automatically and wirelessly detects and receives information continuously and in real time from one or more active RFID tags 28, such as one or more Identec Solutions iD2 RFID Tags or the like, in the vicinity, each of the one or more RFID tags 28 associated with and containing information about an article of interest, place of interest, etc. Optionally, the RFID reader component 26 includes RFID tag reader class software that controls the interface between the browser of the web-enabled device 12 and the RFID reader engine. This RFID tag reader class software incorporates complex fuzzy logic and enables the accurate reading of the RFID tags 28 in real time in support of a mobile user. In general, the RFID reader 26 (or GPS) provides location or proximity information to the Web-enabled device 12 and the natural language query system 10. This location or proximity information and the converted text associated with the user's voice-based query are sent to the remote server 22 for subsequent processing. Based on the location or proximity information received from the RFID reader 26 and the Web-enabled device 12, the remote server 22 retrieves a relevant set of information, images, and/or links which are sent to the Web-enabled device 12 and displayed in the form of one or more Web-pages on the display of the Web-enabled device 12.

If there are no problems with the converted text associated with the user's voice-based query, NLP is then carried out at the remote server 22. First, a semantic engine "interprets" the text associated with the user's voice-based query and converts the text into a formal database query. The semantic engine includes an English query run-time engine 30 and a compiled English query model 32. A database look-up is then performed using the formal database query and the result is sent back to the remote server 22 and finally the Web-enabled device 12, which forms one or more Web-pages incorporating the result. The database look-up is performed by Microsoft Visual FoxPro COM+DLL 34 or the like, a full-text catalog 36, and a SQL server 38. Advantageously, the location or proximity information and the converted text associated with the user's voice-based query received from the Web-enabled device 12 represent multimodal inputs. The location or proximity information provide a context or environment that is used to narrow and streamline the database look-up related to the converted text associated with the user's voice-based query. This is illustrated in the example below.

Optionally, the remote server 22 may also create a voice-based response that is sent to the Web-enabled device 12 and converted into a speech output. Because the natural language query system 10 is multimodal, the user can react with the natural language query system 10 by either speaking or by tapping the display of the Web-enabled device 12. For example, when link in the results Web page is tapped, more detail, including images, may be returned to the Web-enabled device 12.

Figure 2:
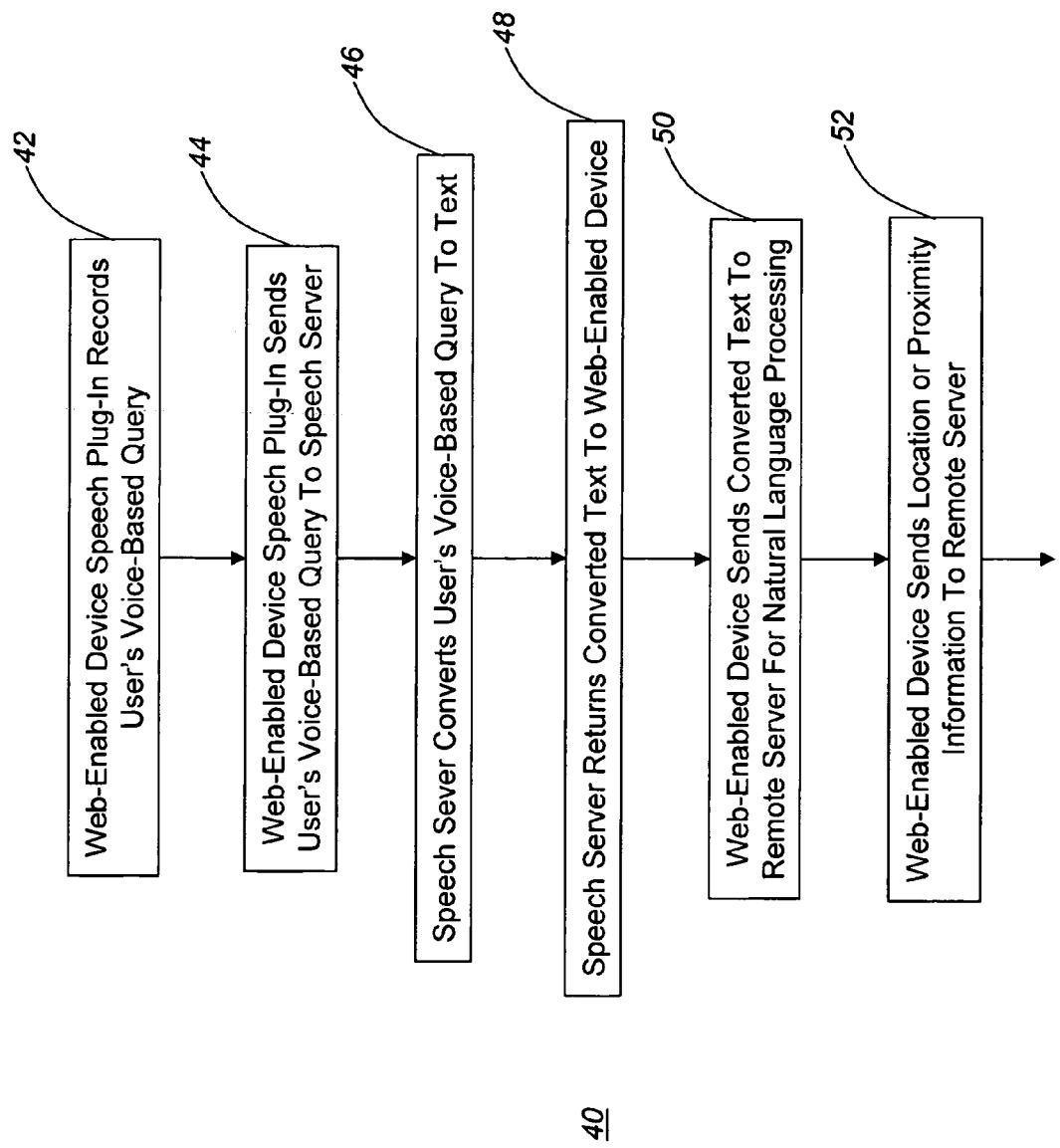
FIG. 2 is a flow chart illustrating one embodiment of the multimodal natural language query method for processing voice and proximity-based queries of the present invention.
Figure 3:
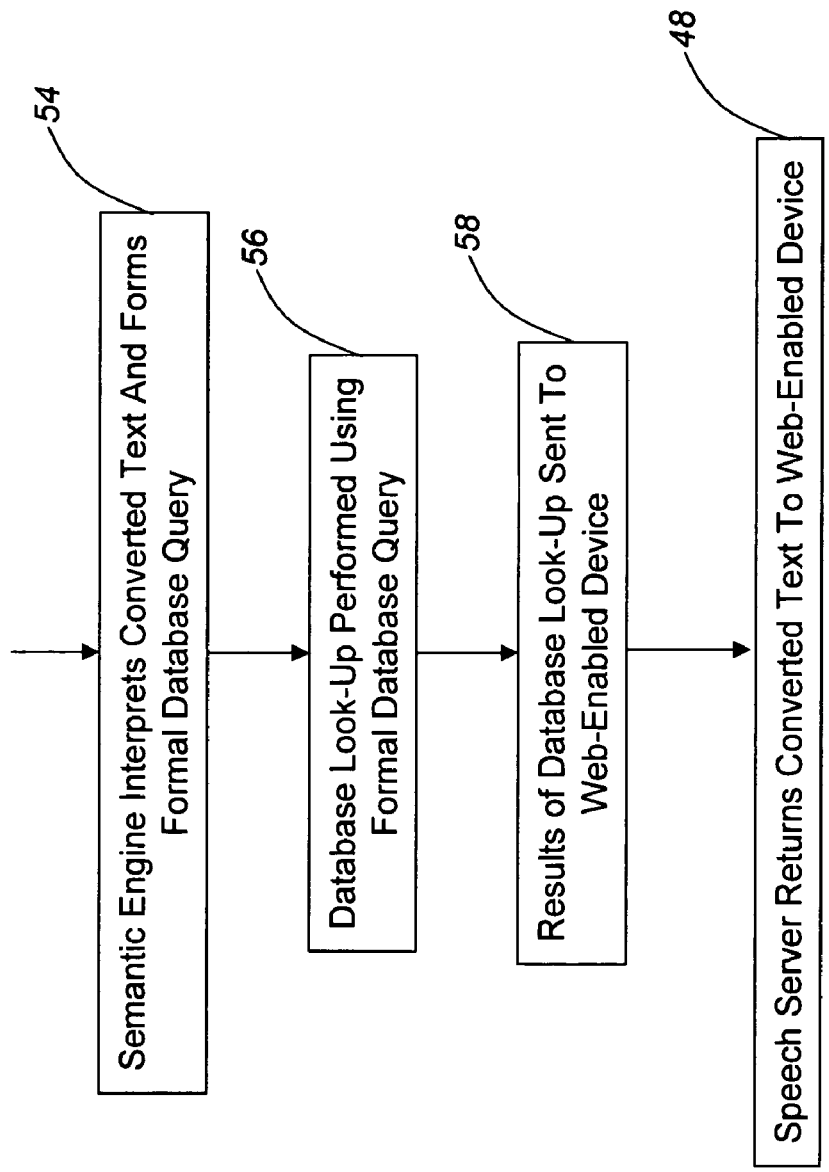
FIG. 3 is a continuing flow chart illustrating one embodiment of the multimodal natural language query method for processing voice and proximity-based queries of the present invention.

Referring to FIGS. 2 and 3, in another specific embodiment of the present invention, the natural language query method 40 includes receiving a voice-based query from a user using the speech plug-in 18 (FIG. 1) of the Web-enabled device 12 (FIG. 1) (Block 42) and converting the voice-based query to text using the speech server 20 (FIG. 1) (Block 46). Specifically, once the speak button or the like associated with the Web-enabled device 12 has been pushed, the speech plug-in 18 detects that a voice-based query has begun, records the voice-based query, and continues until silence is detected. For example, if the user is a patron visiting a particular exhibit in an art museum, the user's query may be "who painted this picture?" As described above, the display of the Web-enabled device 12 may display an audio meter that provides the user with real time feedback regarding volume, background noise, and word gaps that provide the user with an improved interactive experience with the Web-enabled device 12. The speech plug-in 18 then sends the recorded voice-based query to the speech server 20 (Block 44), which converts the voice-based query to text (Block 46) and returns the converted text to the Web-enabled device 12 (Block 48). Preferably, the user's interaction with the Web-enabled device 12 takes place through a speech-enabled Web-page resident on the remote server 22 (FIG. 1) running one or more ASPs 24 (FIG. 1). This Web page is displayed on the display of the Web-enabled device 12.

As described above, the RFID reader 26 (FIG. 1) provides location or proximity information to the Web-enabled device 12 and the natural language query system 10 (FIG. 1). This location or proximity information and the converted text associated with the user's voice-based query are sent to the remote server 22 for subsequent processing (Blocks 50 and 52). For example, each of the exhibits in the art museum is preferably equipped with a corresponding RFID tag 28 (FIG. 1). Thus, the Web-enabled device 12 and the natural language query system 10 "know" which painting the user is standing in proximity to when the user asks "who painted this picture?" Based on the location or proximity information received from the RFID reader 26 and the Web-enabled device 12, the remote server 22 retrieves a relevant set of information, images, and/or links which are sent to the Web-enabled device 12 and displayed in the form of one or more Web-pages on the display of the Web-enabled device 12.

If there are no problems with the converted text associated with the user's voice-based query, NLP is then carried out at the remote server 22. First, a semantic engine "interprets" the text associated with the user's voice-based query and converts the text into a formal database query (Block 54). The semantic engine includes an English query run-time engine 30 (FIG. 1) and a compiled English query model 32 (FIG. 1). A database look-up is then performed using the formal database query (Block 56) and the result is sent back to the remote server 22 and finally the Web-enabled device 12 (Block 58), which forms one or more Web-pages incorporating the result. Advantageously, the location or proximity information and the converted text associated with the user's voice-based query received from the Web-enabled device 12 represent multimodal inputs. The location or proximity information provide a context or environment that is used to narrow and streamline the database look-up related to the converted text associated with the user's voice-based query.

Although the present invention has been illustrated and described with reference to preferred embodiments and examples thereof, it will be readily apparent to those of ordinary skill in the art that other embodiments and examples may perform similar functions and/or achieve similar results. All such equivalent embodiments and examples are within the spirit and scope of the present invention and are intended to be covered by the following claims.

What is claimed is:

1. A natural language query system processing voice and proximity-based queries, comprising:
   a device, comprising:
      a speech input module receiving a voice-based query in natural language form from a user; and
      a location/proximity module receiving location/proximity information from a location/proximity device;
   a speech conversion module converting the voice-based query in natural language form to text in natural language form;
   a natural language processing module converting the text in natural language form to text in searchable form using lexicons and grammar rules to parse sentences and determine underlying meanings of the voice-base query, wherein the underlying meanings are further determined responsive to the location/proximity information from the location/proximity module;
   a semantic engine module converting the text in searchable form to a formal database query; and a database-look-up module using the formal database query to obtain a result related to the voice-based query in natural language form from a database, wherein the location/proximity module is configured to provide a context and environment to the database-look-up module narrowing and streamlining the formal database query associated with the voice-based query, and wherein the narrowing and streamlining is responsive to the location/proximity information.

2. The natural language query system of claim 1, wherein the device comprises a device selected from the group consisting of a Web-enabled portable personal computer, a Web-enabled laptop computer, a Web-enabled personal digital assistant, and a Web-enabled phone.

3. The natural language query system of claim 1, wherein the speech input module comprises a speech plug-in and a microphone.

4. The natural language query system of claim 1, wherein the location/proximity module comprises a location/proximity module selected from the group consisting of a radio frequency identification reader and a global positioning system.

5. The natural language query system of claim 1, wherein the location/proximity device comprises a location/proximity device selected from the group consisting of a radio frequency identification tag and a satellite.

6. The natural language query system of claim 1, wherein the speech conversion module resides in a speech server located remotely from the device.

7. The natural language query system of claim 1, wherein the natural language processing module resides in a server located remotely from the device.

8. The natural language query system of claim 1, wherein the semantic engine module resides in a database server located remotely from the device.

9. The natural language query system of claim 1, wherein the database look-up module resides in a database server located remotely from the device.

10. The natural language query system of claim 1, further comprising a speech output module for delivering the result related to the voice-based query in natural language form to the user.

11. A natural language query architecture stores on a computer readable storage media processing voice and proximity-based queries, comprising:
    a Web-enabled device, comprising:
        a speech plug-in receiving a voice-based query in natural language form from a user; and
        a location/proximity plug-in receiving location/proximity information from a location/proximity device;
    a speech conversion algorithm converting the voice-based query in natural language form to text in natural language form;
    a natural language processing algorithm converting the text in natural language form to text in searchable form using lexicons and grammar rules to parse sentences and determine underlying meanings of the voice-base query, wherein the underlying meanings are further determined responsive to the location/proximity information from the location/proximity plug-in;
    a semantic engine algorithm converting the text in searchable form to a formal database query; and
    a database-look-up algorithm using the formal database query to obtain a result related to the voice-based query in natural language form from a database, wherein the location/proximity plug-in is configured to provide a context and environment to the database-look-up algorithm narrowing and streamlining the formal database query associated with the voice-based query, and wherein the narrowing and streamlining is responsive to the location/proximity information.

12. The natural language query architecture of claim 11, wherein the Web-enabled device comprises a Web-enabled device selected from the group consisting of a Web-enabled portable personal computer, a Web-enabled laptop computer, a Web-enabled personal digital assistant, and a Web-enabled phone.

13. The natural language query architecture of claim 11, wherein the speech input plug-in comprises a speech input plug-in and a microphone.

14. The natural language query architecture of claim 11, wherein the location/proximity plug-in comprises a location/proximity plug-in selected from the group consisting of a radio frequency identification reader and a global positioning system.

15. The natural language query architecture of claim 11, wherein the location/proximity device comprises a location/proximity device selected from the group consisting of a radio frequency identification tag and a satellite.

16. The natural language query architecture of claim 11, wherein the speech conversion algorithm resides in a speech server located remotely from the Web-enabled device.

17. The natural language query architecture of claim 11, wherein the natural language processing algorithm resides in a server located remotely from the Web-enabled device.

18. The natural language query architecture of claim 11, wherein the semantic engine algorithm resides in a database server located remotely from the Web-enabled device.

19. The natural language query architecture of claim 11, wherein the database-look-up algorithm resides in a database server located remotely from the Web-enabled device.

20. The natural language query architecture of claim 11, further comprising a speech output plug-in delivering the result related to the voice-based query in natural language form to the user.

21. A natural language query method processing voice and proximity-based queries, comprising:
    providing a device, comprising:
        a speech input module receiving a voice-based query in natural language form from a user; and
        a location/proximity module receiving location/proximity information from a location/proximity device;
    converting the voice-based query in natural language form to text in natural language form using a speech conversion module;
    converting the text in natural language form to text in searchable form using a natural language processing module configured to use lexicons and grammar rules to parse sentences and determine underlying meanings of the voice-based query, wherein the underlying meanings are further determined responsive to the location/proximity information from the location/proximity module;
    converting the text in searchable form to a formal database query using a semantic engine module;
    narrowing the formal database query responsive to the location/proximity information from the location/proximity module, wherein the location/proximity module is configured to provide a context and environment narrowing and streamlining the formal database query associated with the voice-based query; and obtaining a result related to the voice-based query in natural language form from a database using the formal database query and a database-look-up module.

22. The natural language query method of claim 21, wherein the device comprises a device selected from the group consisting of a Web-enabled portable personal computer, a Web-enabled laptop computer, a Web-enabled personal digital assistant, and a Web-enabled phone.

23. The natural language query method of claim 21, wherein the speech input module comprises a speech plug-in and a microphone.

24. The natural language query method of claim 21, wherein the location/proximity module comprises a location/proximity module selected from the group consisting of a radio frequency identification reader and a global positioning system.

25. The natural language query method of claim 21, wherein the location/proximity device comprises a location/proximity device selected from the group consisting of a radio frequency identification tag and a satellite.

26. The natural language query method of claim 21, wherein the speech conversion module resides in a speech server located remotely from the device.

27. The natural language query method of claim 21, wherein the natural language processing module resides in a server located remotely from the device.

28. The natural language query method of claim 21, wherein the semantic engine module resides in a database server located remotely from the device.

29. The natural language query method of claim 21, wherein the database-look-up module resides in a database server located remotely from the device.

30. The natural language query method of claim 21, further comprising delivering the result related to the voice-based query in natural language form to the user using a speech output module.

* * * * *